(12) United States Patent
Ikeuchi et al.

(10) Patent No.: US 7,076,058 B2
(45) Date of Patent: Jul. 11, 2006

(54) PORTABLE TELEPHONE SET

(75) Inventors: Shinji Ikeuchi, Tokyo (JP); Kazuo Ootsuta, Tokyo (JP)

(73) Assignee: NEC Corporation, Tokyo (JP)

( * ) Notice: Subject to any disclaimer, the term of this patent is extended or adjusted under 35 U.S.C. 154(b) by 356 days.

(21) Appl. No.: 10/421,804

(22) Filed: Apr. 24, 2003

(65) Prior Publication Data

US 2003/0202656 A1    Oct. 30, 2003

(30) Foreign Application Priority Data

Apr. 26, 2002 (JP) ............................. 2002-125610

(51) Int. Cl.
*H04M 1/00* (2006.01)
(52) U.S. Cl. ............................. 379/433.12; 379/433.1; 455/566; 455/575.4
(58) Field of Classification Search ........... 379/433.12, 379/433.01, 433.1, 433.13; 455/575.1, 90.3, 455/575.4, 566; 340/573.1
See application file for complete search history.

(56) References Cited

U.S. PATENT DOCUMENTS

| | | | | |
|---|---|---|---|---|
| 5,224,076 | A | * | 6/1993 | Thorp ...................... 379/433.1 |
| 5,907,615 | A | * | 5/1999 | Kaschke ................ 379/433.12 |
| 6,035,035 | A | * | 3/2000 | Firooz ..................... 379/433.1 |
| 6,233,469 | B1 | | 5/2001 | Watanabe |
| 6,397,084 | B1 | * | 5/2002 | Wicks et al. ................. 455/566 |
| 6,748,249 | B1 | * | 6/2004 | Eromaki et al. ......... 455/575.4 |
| 6,774,796 | B1 | * | 8/2004 | Smith ....................... 340/573.1 |

FOREIGN PATENT DOCUMENTS

| | | |
|---|---|---|
| EP | 1 051 012 A2 | 11/2000 |
| GB | 2 322 504 A | 8/1998 |
| GB | 2 326 052 A | 12/1998 |
| GB | 2 375 683 A | 11/2002 |
| JP | 2000-68883 A | 3/2000 |
| JP | 2001-144836 A | 5/2001 |
| JP | 2001-292213 A | 10/2001 |
| JP | 2001-339497 A | 12/2001 |

* cited by examiner

*Primary Examiner*—Harry S. Hong
(74) *Attorney, Agent, or Firm*—Sughrue Mion, PLLC

(57) ABSTRACT

A first and a second unit 1 and 2 with components mounted thereon in correspondence to respective function blocks, into which portable telephone set functions are grouped, are capable of being slidably moved between a stacked state position and an extended state position. The first unit 1 includes a first component-mounted part having a display 5 and a receiver 4. The second unit 2 includes a second component-mounted part, which is covered when the stacked state position is brought about and exposed when the extended state position is brought about. The second unit 2 has a notch 9, in which a first and a second auxiliary unit 11 and 12 are provided. A desired component-mounted part can be exposed and operated by causing selective sliding of the first and second units 1 and 2 and the first and second auxiliary units 11 and 12.

20 Claims, 6 Drawing Sheets

PORTABLE TELEPHONE SET

BACKGROUND OF THE INVENTION

This application claims benefit of Japanese Patent Application No. 2002-125610 filed on Apr. 26, 2002, the contents of which are incorporated by the reference.

The present invention relates to a portable telephone set, in which a plurality of component-mounted units are provided in correspondence to respective function blocks, into which the functions of the portable telephone set are grouped, the units being slidable in use to a stacked state and developed states.

The usual portable telephone set has such a foldable structure to meet the demand for size reduction that its body is constituted by two units of substantially angular thick board types with stem ports of the units coupled together by a coupling member having a hinge structure. Normally, the portable telephone set is used in a folded state, and at the time of speech communication it is used in a developed state. Recently, a slide type structure may be adopted to provide a more compact set than the foldable portable telephone set.

This slide type structure has a first and a second unit, on which components for attaining a first and a second function of a portable telephone set capable of being operated for predetermined operations are separately mounted, the second unit being slidable in the longitudinal direction relative to the first unit. This structure is carried such that the two units are overlapped or stacked, and for speech communication of the like the two units are caused to slide in the longitudinal direction and extended.

As an example, a "Portable Telephone Set" disclosed in Japanese Patent Laid-Open No. 2001-144386, has a display unit having a large area display for character display thereon. For compact accommodation, the display unit is slidably moved over a low use frequency operation key group to cover the same key group. When using an operation key, the display unit is slidably moved to expose the operation key.

In the meantime, recent portable telephone sets have become utilized not only for speech communication but also as browser for internet and like purposes, electronic mail transmitting/receiving terminals, and portable data terminals having such additional functions as schedule management. For this reason, the display contents are versatile including large quantities of character data and images, the display is also in a trend of increasing size, and portable telephone sets provided with an optical function part for versatility increase and performance improvement are in practical use.

A function example of the optical function part is an electronic camera function. Specifically, an electronic camera which is mounted on or inside the portable telephone set body to take out image data and transmit the taken-out image data to the opposite side. Another function example is a fingerprint certification function. In this function, only proper user is allowed to operate the machine. Also, for confirming the transmitter as such, the machine body is provided with an optical aperture for fingerprint read-out. The certification is made with a finger pressed against the optical aperture.

Since the prior art portable telephone set has various functions mounted on it and also is complicated in operation, it is constructed such that its necessary locality among operation buttons, display and optical function parts such as electronic camera and fingerprint recognition unit is exposed for operation or display in correspondence to a function that is provided. Therefore, although it is possible to improve the convenience of use, since the functions are grouped in two separate function blocks, limitation is imposed on the compactness when carrying the set. Improvement in this connection has been greatly desired.

SUMMARY OF THE INVENTION

An object of the present invention is to provide a portable telephone set, which permits a great variety of its functions to be grouped into a greater number of function blocks than in the prior art and thus greatly improving the convenience of use, and can also be more compact than the prior art shape when it is carried.

According to an aspect of the present invention, there is provided a portable telephone set having a slide mechanism part for causing sliding of a first and a second unit with component mounted thereon in correspondence to respective function blocks, into which the portable telephone set functions are grouped, between a stacked state position and an extended state position, comprising: a first unit including a first component-mounted part having a display and a receiver; a second unit including a second component-mounted part to be partly or fully covered when the first and second units are brought to the stacked state position and exposed when the two units are brought to the extended state position; and at least one auxiliary unit slidably coupled to the second unit via a slide mechanism for sliding between an auxiliary stacked state position and an auxiliary extended state position such as to cover the second component-mounted part when brought to the auxiliary stacked state position and fully or partly expose the second component-mounted part when brought to the auxiliary extended state position.

According to another aspect of the present invention, there is provided a portable telephone set having a slide mechanism for causing sliding of adjacent ones of a first to a third unit with components mounted thereon in correspondence to respective function blocks, into which the portable telephone set functions are grouped, comprising: a first unit including a component-mounted part having a display and a receiver; a second unit including a second component-mounted part to be covered when the first and second units are brought by the slide mechanism part to the stacked state position and exposed when the two units are brought to the extended state position; and a third unit to be covered when the second and third units are brought by the slide mechanism part to the stacked state position and exposed when the two units are brought to the extended state position.

The second or third unit includes a fingerprint certifier unit. The first or third unit includes a fingerprint certifier unit.

The portable telephone set further comprises a position detector part for checking whether adjacent ones of the first, second and auxiliary units are in the stacked state or the extended state.

The portable telephone set further comprises a mode switching control part for changing the operation mode of the portable telephone set according to the inter-unit state detected by the position detector part.

The portable telephone set further comprises a control means for performing communication start control when the inter-unit state is changed from the stacked state to the extended state at the time of call reception and doing communication end control when the inter-unit state is changed from the extended state to-the stacked state during communication.

Other objects and features will be clarified from the following description with reference to attached drawings.

PREFERRED EMBODIMENTS OF THE INVENTION

Figure 1:
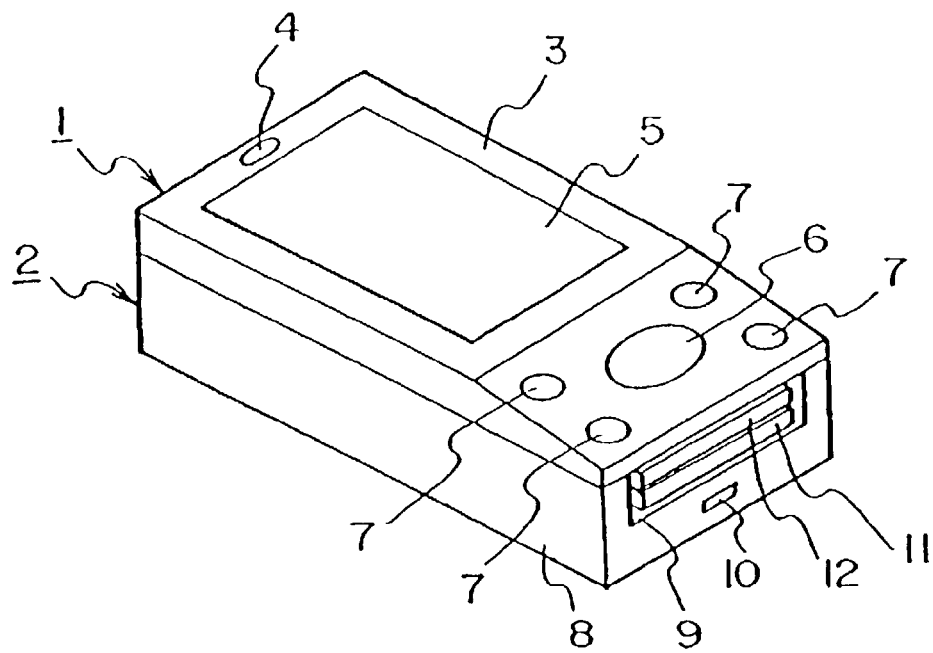
FIG. 1 shows a portable telephone set in the stacked state according to a first embodiment of the present invention.
Figure 2:
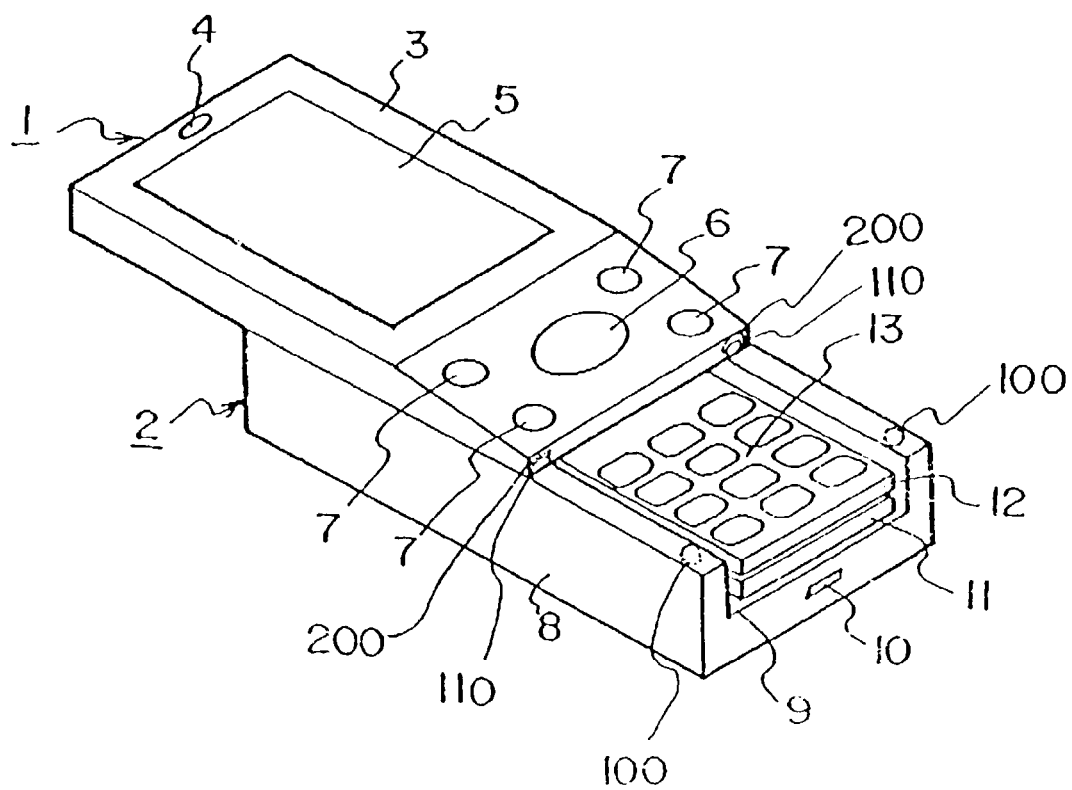
FIG. 2 shows a portable telephone set in a first extended state according to the first embodiment of the present invention.
Figure 3:
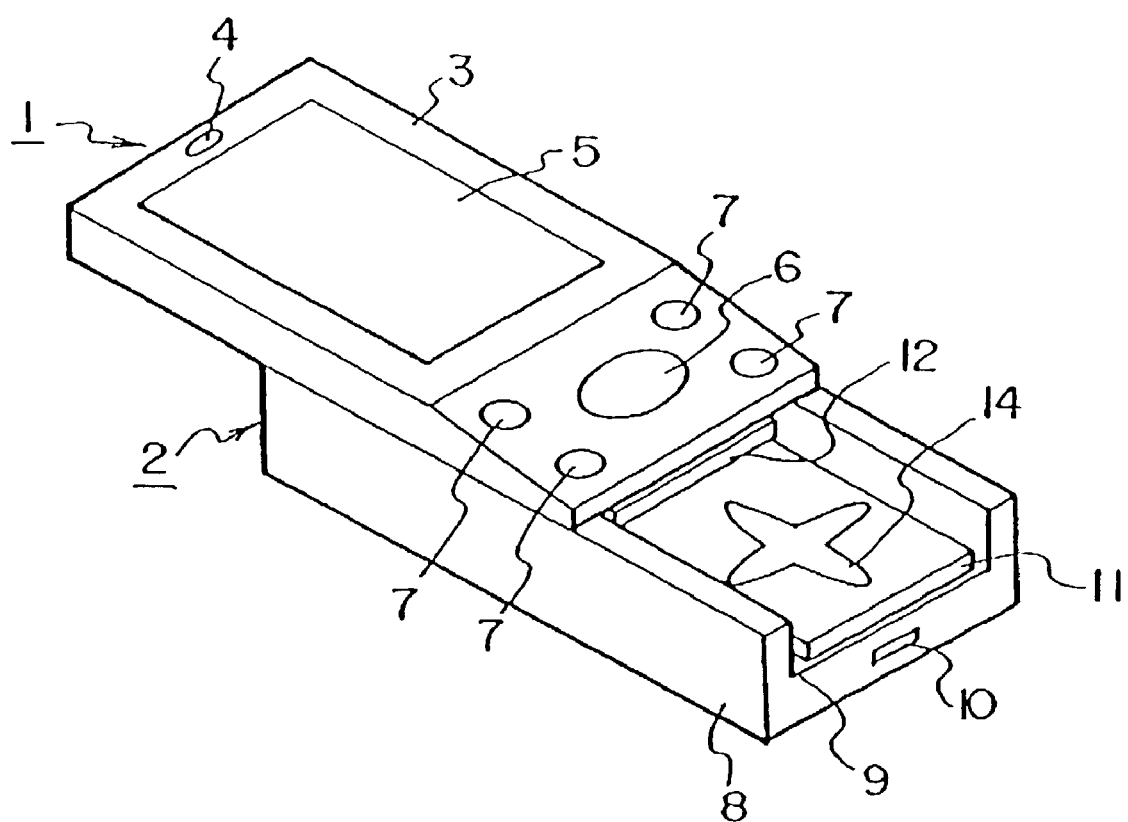
FIG. 3 shows a portable telephone set in a second extended state according to the first embodiment of the present invention.
Figure 4:
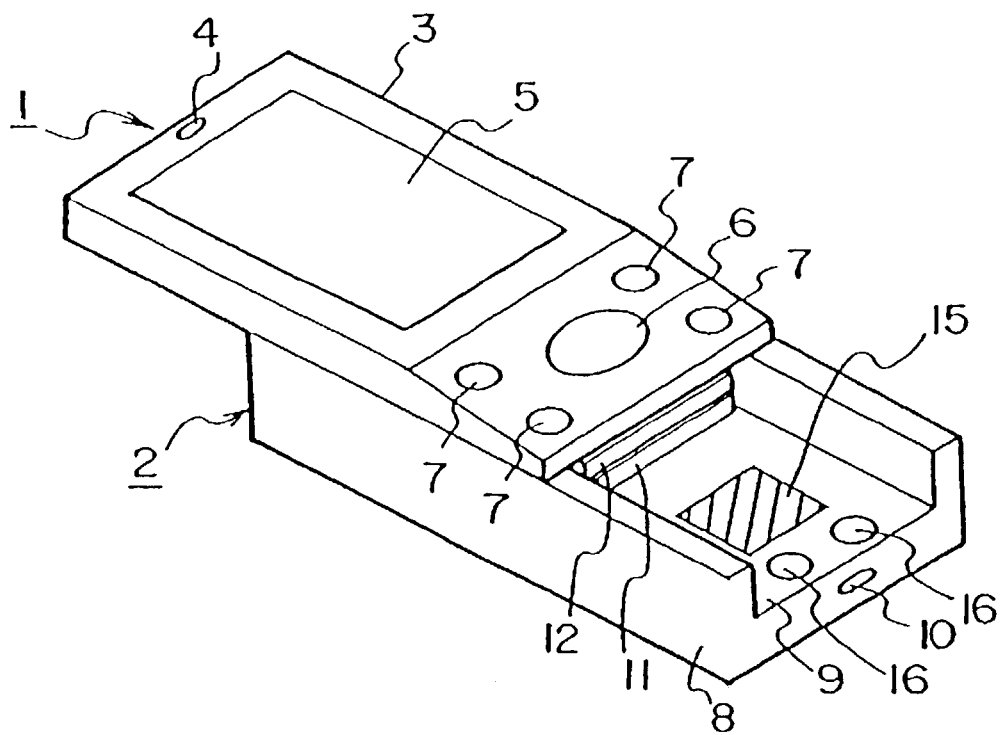
FIG. 4 shows a portable telephone set in a third extended state according to the first embodiment of the present invention.

Preferred embodiments of the present invention will now be described with reference to the drawings. This embodiment of the portable telephone set can assume a total of four different states, i.e., a stacked state and a first to a third extended state. FIG. 1 shows the set in the stacked state, and FIGS. 2 to 4 show the set in the first to third extended states, respectively.

Referring to FIG. 1 showing the portable telephone set in the stacked state, the portable telephone set is in the form of a rectangular thick board in its overall appearance, and its longitudinal dimension is greatly reduced and made compact compared to the prior art foldable portable telephone set.

In the portable telephone set, a first and a second units 1 and 2 in the form of a rectangular thick board are provided in a stacked form. The two units 1 and 2 are coupled together by a mechanical part (not shown) which permits sliding of the first unit 1 in the longitudinal directions relative to the second unit 2. A mechanism (not shown) for preventing detachment of the two units 1 and 2 is also provided.

The first unit 1 has an aperture of a receiver 4, which is buried in a short side part of first casing 3 having a rectangular form. The first unit 1 also has an exposed dot matrix type large screen display 5 provided forwardly of the receiver aperture. The first unit 1 further has an exposed direction command key 6, which is disposed adjacent to the other short side and operable for commanding the directions of switching of a plurality of different modes, and four independent keys 7, which are disposed radially around the direction command key 5 and operable for designating specific modes or execution of applications and also for providing commands for specific operations.

The second unit 2 which is provided slidably on the first unit 1 having the above construction, has a second casing 8, which is substantially in the same rectangular thick board form as in the first unit 1, and has a built-in transmitter 10 with the aperture thereof exposed on one short side. The second unit 2 also has a notch 9 having a groove dimension which is substantially one half the longitudinal dimension of the second casing 8. In the notch 9, a first and a second auxiliary units 11 and 12 are supported via a support mechanism (not shown) such that they are movable between their position as shown in FIG. 1 and a position assumed when they are slidably pushed inwardly of the second casing 8.

A first position state, in which the first unit 1 is overlapped or stacked as shown in FIG. 1, and a second position state which is attained by extension of the first unit 1 as shown in FIG. 2, are detected by a suitable detecting means. As an example, as shown in FIG. 2, the first unit 1 has two (or one) contact points 200 provided at the opposite ends of its bottom, and the second unit 2 has contact points 100 provided at one end to be in contact with the contact points 200 in the first position state and also has contact points 110 to be in contact with the contact points 200 in the second position state. The state detection is made by detecting the state of contact of the contact points 200 and the contact points 100 or 110.

Thus, provided as the structure of the embodiment of the portable telephone set is, a portable telephone set having a slide mechanism part permitting sliding of a first and a second unit with mounted components of respective function blocks, into which the portable telephone set functions are grouped, between a stacked state position and an extended state position, the portable telephone set comprising a first unit 1 including a first component-mounted part having a display 5 and a receiver 4, a second unit 2 including a second component-mounted part partly or fully covered by the first unit when the first and second units are brought to the stacked state position and exposed when the first and second units are brought to the extended state position, and at least one auxiliary unit (i.e., a first and a second auxiliary units 11 and 12 in this embodiment) provided on the second unit 2 and slidable via a slide mechanism between an auxiliary stacked state position and an auxiliary extended state position, the auxiliary unit covering the second mounting part when brought to the auxiliary stacked state position and partly or fully exposing the second component-mounted part when brought to the auxiliary extended state position. By the term "auxiliary stacked state position" is meant a position of the auxiliary unit 11 or 12 in a state without longitudinally inward sliding over the second unit 2 (i.e., state shown in FIGS. 1 and 2). By the term "auxiliary extended state position" is meant a position of the auxiliary unit 11 or 12 in a state after completion of the longitudinal inward sliding (i.e., state shown in FIGS. 3 and 4).

In the use of the portable telephone set shown in FIG. 1, by slidably moving the second and first units 2 and 1 away from each other in the extending directions, as shown in FIG. 2, a front part of the second unit 2, i.e., the inside of the notch 9, more specifically the ten-key set 13 provided on the surface of the second auxiliary unit 12, is exposed.

In this state, it is possible to operate the ten-key set 13 in addition to the operation of the direction command key 6 and the independent keys 7, these keys being capable of being operated at any time. For example, it is possible to dial a particular telephone number as such without use of telephone number abbreviation memory. Also, it is possible to make access using the ten-key set during speech communication.

Thus, by slidably moving the second auxiliary unit 12 longitudinally inward and pushing the same up to the short side edge of the first unit 1, the ten-key set 13 shown in FIG. 2 is covered by the first unit 1 so that it can no longer be used. At the same time, as shown in FIG. 3, the direction command key 14 provided on the surface of the first auxiliary unit 11 is exposed, and it is now possible to make selective operation concerning the directions of switching of various modes by using the direction command key 14.

By slidably moving the first auxiliary unit 11 longitudinally inward and pushing the same up to the short side edge of the first unit 1, a direction command key 14 shown in FIG. 3 is covered by the first unit 1 so that it can no longer be used. At the same time, as shown in FIG. 4, a fingerprint certification pad 15 and two independent keys 16 are exposed. In this state, by pushing a finger against the fingerprint certification pad 15, the fingerprint shape is optically detected, and the certification operation is done. At this time, the independent keys 16 can be used, if necessary.

Thus, in the stacked state of the portable telephone set it is possible to make operations using the display 5, the direction command key 6 and the independent keys 7. In the first extended state, operations with the ten-key set 13 can be made in addition to the operations that can be made in the stacked state. In the second extended state, operations with the direction command key 14 may be made in lieu of the operations with the ten-key set 13 in the first extended state. In the third extended state, a recognition operation with the fingerprint certification pad 15 and operations with the independent keys 16 may be made in lieu of the operations with the ten-key set 13 and the operations with the independent keys 16 in addition to the operations in the stacked state.

The first and second auxiliary units 11 and 12 in this embodiment have different functions. However, it is possible to provide several units, which have the same functions but are different in such design as color, material and shape. These units may be selectively used in dependence on the user's feeling.

For withdrawing the first and second auxiliary units 11 and 12 from their pushed-in state as shown in FIG. 4 to their initial (original) state, they may be provided at the end with knobs or the like for being gripped and pulled. For restoring the first and second auxiliary units 11 and 12 from their pushed-in state to the initial state, any desired structure may be used, for instance, one which permits the first and second auxiliary units 11 and 12 to be restored by a restoring force of a spring when the units 11 and 12 are further pushed.

Figure 9:
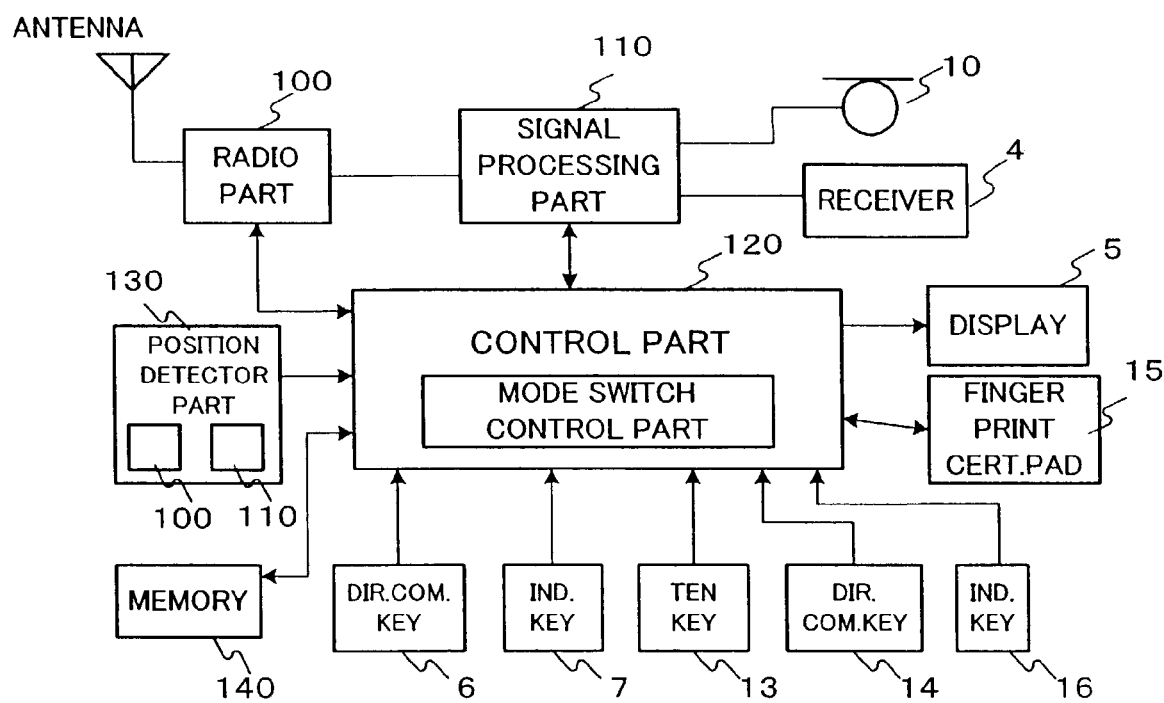
FIG. 9 is a block diagram showing a construction of the portable telephone set according to the embodiment.

FIG. 9 is a block diagram showing an example of the circuit construction of the embodiment of the portable telephone set. Referring to the Figure, a radio part 100 is a circuit for demodulating radio signals from an antenna and for modulating signals from a signal processing circuit 110. The signal processing circuit 110 has a baseband processing circuit and an A/D and a D/A converter for audio signal, and it is also connected to a transmitter 10 ad a receiver 4. A control part 120 includes wireless communication control and display control of the display 5 and controls the overall system. The control part 120 further includes a mode switching control part for switching operation modes of the portable telephone set such as communication mode and game mode based on game application. A position detector part 130 detects the extended and stacked states of the first unit 1 and the first and second auxiliary units 11 and 12, and outputs a detection signal to the control part 120. The control part 120 thus can control the state of use of keys on the unit according to the result of detection of stacked and extended states of the units in the position detector part 130. The memory 140 stores various applications such as game applications. The control part 120 reads out applications from the memory 140 and execute the read-out applications.

Figure 5:
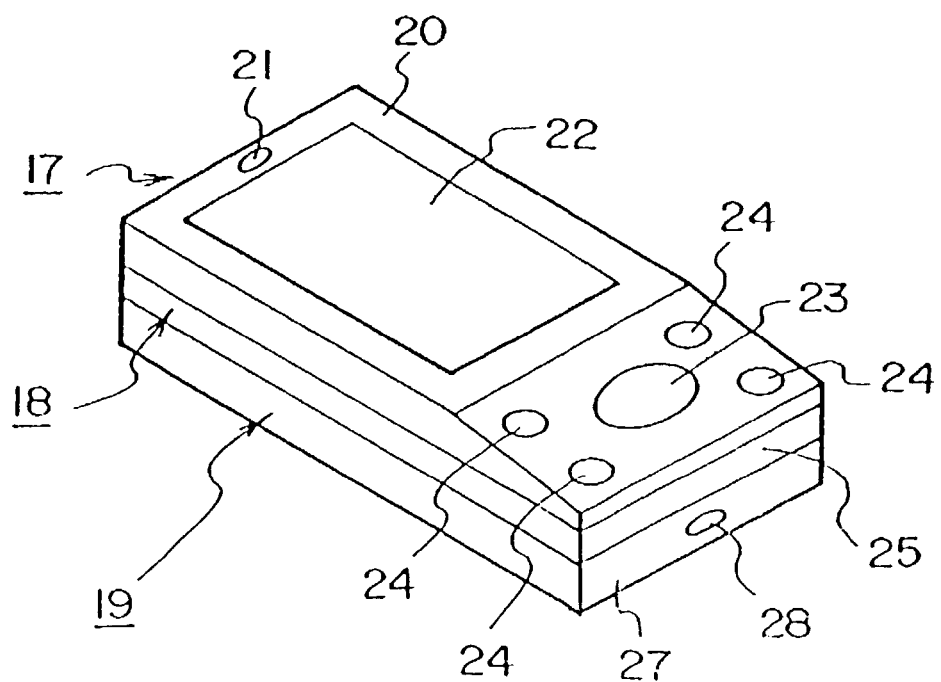
FIG. 5 shows a portable telephone set in the stacked state according to a second embodiment of the present invention.
Figure 6:
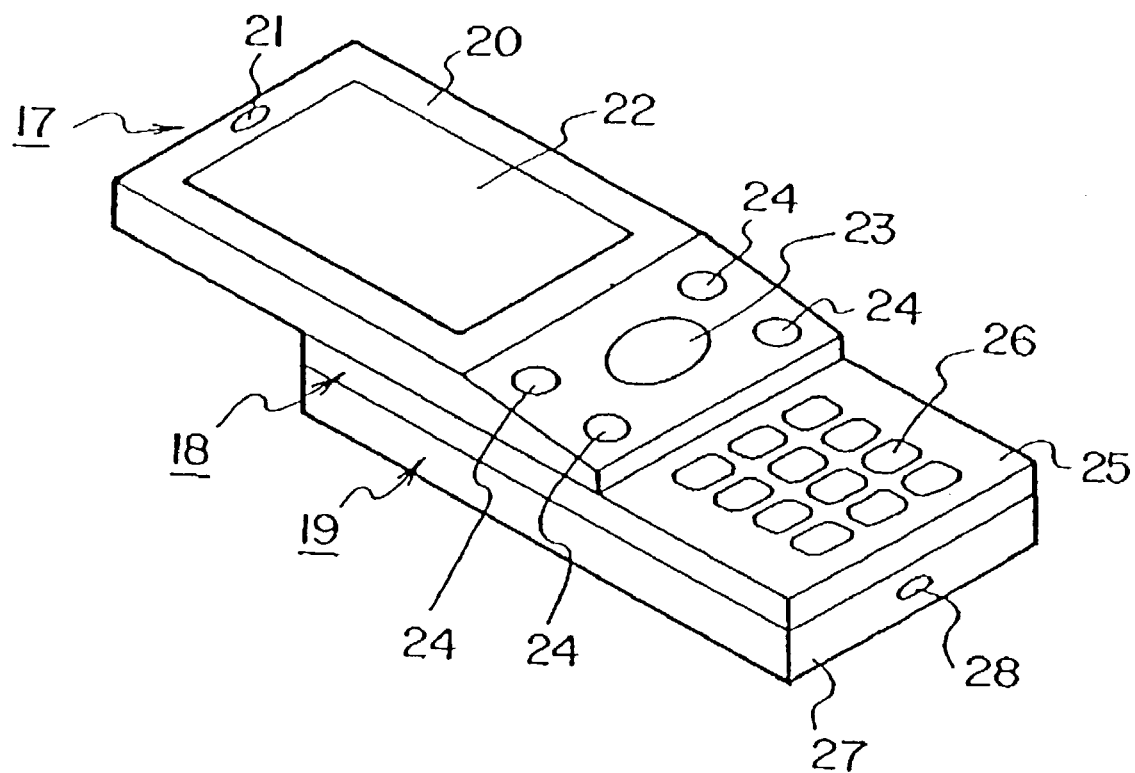
FIG. 6 shows a portable telephone set in a first extended state according to the second embodiment of the present invention.
Figure 7:
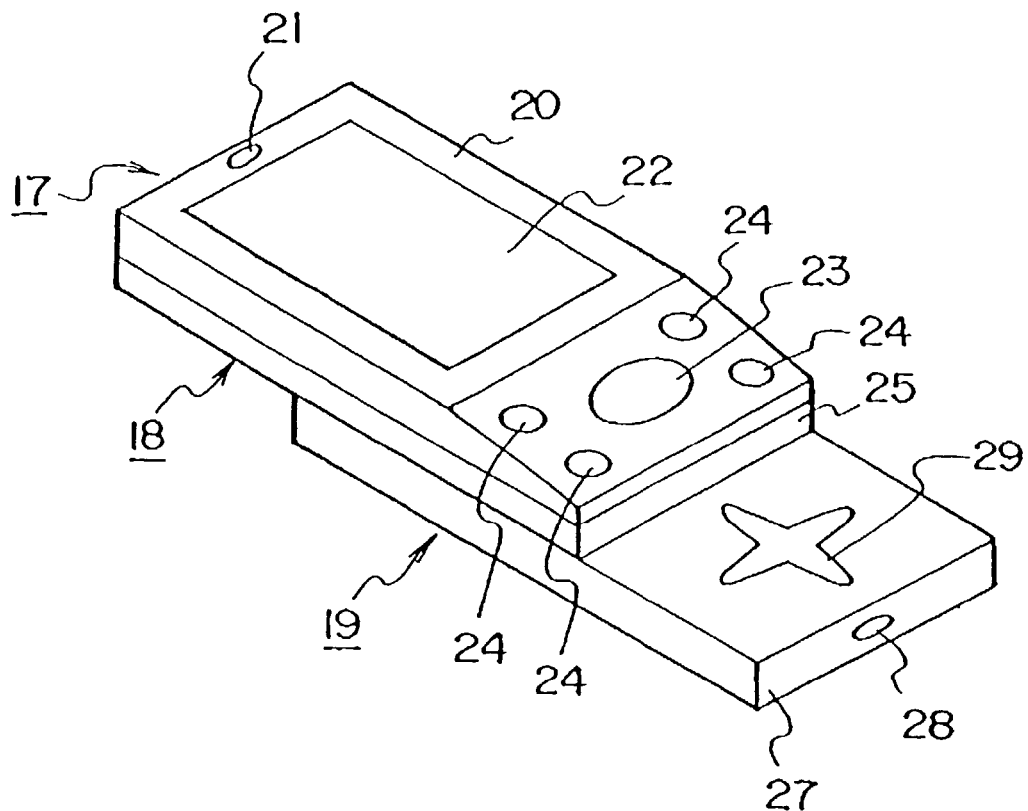
FIG. 7 shows a portable telephone set in a second extended state according to the second embodiment of the present invention.
Figure 8:
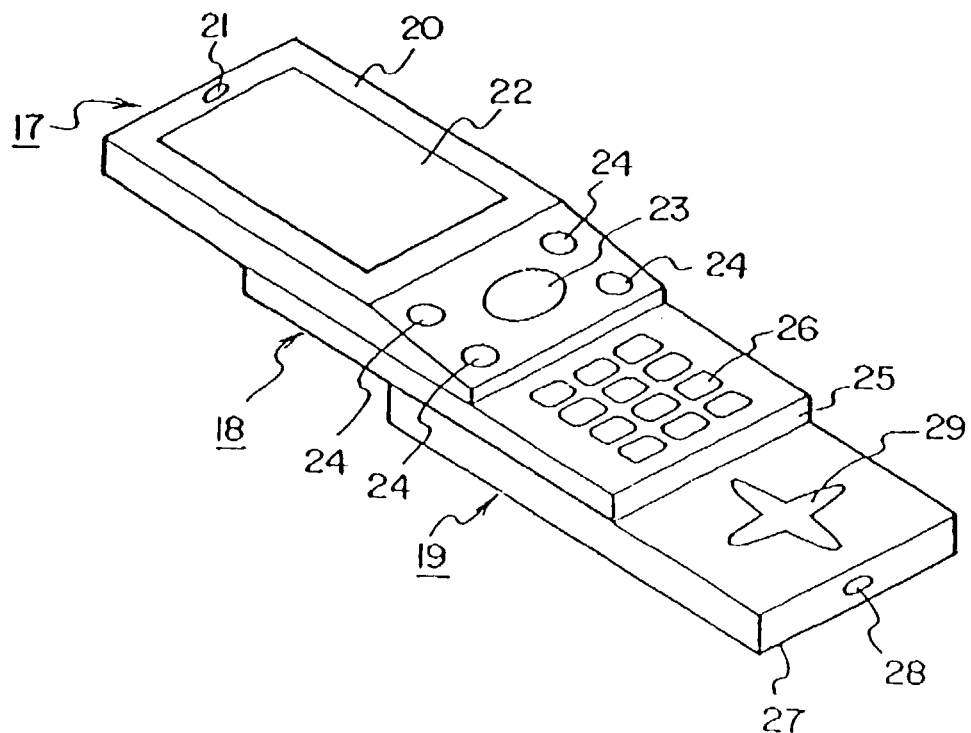
FIG. 8 shows a portable telephone set in a third extended state according to the second embodiment of the present invention.

A second embodiment of the portable telephone set according to the present invention will now be described with reference to FIGS. 5–8. This embodiment of the portable telephone set can assume four different states, i.e., a stacked state and a first to a third extended state. FIG. 5 shows a stacked state, and FIGS. 6 to 8 show the first to third extended states.

Referring to FIG. 5 showing the portable telephone set in the stacked state, the portable telephone set is in the form of a rectangular thick board in overall appearance, and its longitudinal dimension or length is greatly reduced and made more compact compared to the prior art foldable telephone set.

In the portable telephone set, a first to a third unit 17 to 19 in the form a rectangular thick board are provided in a stacked form. The second and first units 18 and 17 are coupled together by a mechanical part (not shown) which permits sliding of the first unit 17 in the longitudinal direction relative to the second unit 18, and the second and third units 18 and 19 are coupled together by a mechanical part (not shown) which permits sliding of the second unit 18 in the longitudinal direction relative to the third unit 19. A detachment prevention mechanism (not shown) is provided between the first and second units 17 and 18, and another detachment prevention mechanism (not shown) is provided between the second and third units 18 and 19.

The first unit 17 has an aperture of a receiver 21, which is buried in a short side part of a first casing 20 in a rectangular form. The first unit 17 also has an exposed dot matrix type large screen display 22 provided forwardly of the receiver aperture. The first unit 17 further has an exposed direction command key 23, which is disposed adjacent to the other short side and operable for commanding the directions of switching of a plurality of different modes, and also four independent keys 23, which are disposed radially around the direction command key 23 and operable for providing particular operation commands.

The third unit 19 which is slidably movable to the second unit 18 having the above construction, has a third casing 27, which is substantially in the same rectangular thick board from as the second unit 18, and has an aperture of a receiver 28 built in a short side part.

Thus, this embodiment of the portable telephone set has a slide mechanism part permitting sliding of a first to a third unit 17 to 19 with mounted components of respective function blocks, into which the portable telephone set functions are grouped, between a stacked state position and extended state positions. In the portable telephone set, the first unit 17 includes a first component-mounted part having a display 22 and a receiver 21, the second unit 18 includes a second component-mounted part (i.e., ten-key set 26 described later), which is covered when the first and second units 17 and 18 are brought by the slide mechanism to the stacked position state and exposed when the two units are brought to the extended state, and the third unit 19 including a third component-mounted part (i.e., direction command key 29 to be described later), which is covered when the second and third units are brought by the side mechanism part to the stacked state position and exposed when the two units are brought to the extended state.

When using the portable telephone set in the stacked state as shown in FIG. 5, by slidably moving the first and second units 17 and 18 away from each other in the extending directions, as shown in FIG. 6, the ten-key set 26 provided on the surface of the second casing 25 of the second unit 18 is exposed.

The second unit 18 which is provided slidably relative to the first unit 17, has the second casing 25, which is substantially in the same rectangular thick board form and has the ten-key set 26 provided adjacent to one short side.

Thus, in the state noted above it is possible to operate the ten-key set 26 in addition to the operations using the direction command key 23 and the independent keys 24, these keys being normally operable. For example, it is possible to dial a particular telephone number as such without use of any telephone number abbreviation memory. Also, it is possible to make accessing using the ten-key set during speech communication.

By slidably moving the second unit 18 from the first extended state position as shown in FIG. 6 longitudinally inward toward the first unit 17 and pushing the same up to the short side edge of the first unit 17, the ten-key set 26 as shown in FIG. 6 is covered by the first unit 17 so that it can no longer be used. At the same time, the direction command key 29 provided on the surface of the third casing 28 of the third unit 19 is exposed. In this state, it is possible to make operation of selecting directions of switching of various modes by using the direction command key 29.

By slidably moving the first unit 12 from the state as shown in FIG. 7, in which the first and second units are in a perfectly stacked state, longitudinally inward relative to the second unit 18, the ten-key set 26 which has been covered by the first unit 17 is exposed as shown in FIG. 8.

Thus, operations of the ten-key set 26 and the operations of the direction command key 29 may be made in addition to the operations using the direction command key 23 and the independent keys 24, these keys being normally operable.

It is to be summarized that in the stacked state operations using the display 22, the direction command key 23 and the independent keys 24 may be made, in the first extended state operations of the ten-key set 26 may be made in addition to the operations in the stacked state, in the second extended state operations of the direction command key 29 may be made in lieu of the operations of the ten-key set 26 in the extended state, and in the third extended state operations using all of the display 22, the direction command key 23, the independent keys 24, the ten-key set 26 and the direction command key 29.

The second embodiment of the portable telephone set according to the present invention has the same construction as the first embodiment shown in FIG. 9, and it is different from the first embodiment in the method of position detection in the position detector part with difference of the slide form.

In the above two embodiments, the components to be mounted in the pluralities of units can be selected as desired. For example, the components maybe a ten-key set, a cross key, a pointing device, a touch panel, a fingerprint certifier and particular application keys. It is also of course to include a fingerprint certifier unit and an electronic imaging unit.

It is also possible to additionally construct a position detector part, which serves to check whether adjacent ones of the units are in the stacked state or the extended state, and a mode switching control part, which serves to change the operation modes of the portable telephone set in dependence on the state of the adjacent ones of the unit as detected by the position detector part. It may be made that the normal telephone mode and game mode for carrying out frames are available for switching.

Furthermore, it is possible to additionally construct a control means, which does communication start control when the inter-unit state is changed from the stacked state to the extended state at the time of call reception and also does communication end control when the inter-unit state is changed from the extended state to the stacked state at the time of the communication. It is thus possible to provide a portable telephone set with improved convenience of use.

In the instant embodiment, it is possible to reduce power consumption by permitting power supply to and only to units in operation.

As has been made obvious in the foregoing, the portable telephone set according to the present invention is constructed such that a unit having a display and another unit are made to be in a stacked state when it is accommodated and in an extended state when it is used. Thus, it is possible to satisfy both large screen display and size reduction. Also, even when both the units are brought to the stacked state by slidably moving them, the display and the minimum necessary operation parts are always exposed, and it is thus possible to compactly carry the set while watching the display for instantly making communication and other operations.

Also, in a recent portable telephone set with various functions mounted to increase the complexity of operations, the portable telephone set functions can be grouped into a plurality of function blocks, and the state of the set can be easily changed between the stacked state and the extended state when using the respective functions. That is, it is possible to freely change the state of the portable telephone set so as to expose a necessary part among operable pushbuttons, display, electronic camera and such optical function part as for fingerprint recognition for operation or display, and it is thus possible to provide improved convenience of use.

Thus, it is possible to group the various functions of the portable telephone set to a greater number of function blocks than in the prior art without sacrifice in the convenience of use. It is thus possible to make the portable telephone set to be more compact at the time of carrying, while greatly improving the convenience of use.

Changes in construction will occur to those skilled in the art and various apparently different modifications and embodiments may be made without departing from the scope of the present invention. The matter set forth in the foregoing description and accompanying drawings is offered byway of illustration only. It is therefore intended that the foregoing description be regarded as illustrative rather than limiting.

What is claimed is:

1. A portable telephone set comprising:
   a first unit including a first component-mounted part having a display and a receiver;
   a second unit including a second component-mounted part slidably connected to the first unit so that the second component-mounted part is partly or fully covered when the first and second units are brought to a stacked state position; and
   at least one auxiliary unit, including an auxiliary component-mounted part, slidably coupled to the second unit via a slide mechanism for sliding between an auxiliary stacked state position and an auxiliary extended state position so as to cover the second component-mounted part and at least partially expose the auxiliary component-mounted part when brought to the auxiliary stacked state position and fully or partly expose the second component-mounted part and cover the auxiliary component-mounted part when brought to the auxiliary extended state position.

2. A portable telephone comprising:
a first unit including a first component-mounted part having a display and a receiver;
a second unit including a second component-mounted part;
a third unit including a third component-mounted part; and
a slide mechanism which allows the first unit and the third unit to slide relative to the second unit, whereby the first unit and the third units may independently be selectively stacked with the second unit or extended with respect to the second unit.

3. The portable telephone set according to claim 1, wherein the second unit includes a fingerprint certifier unit.

4. The portable telephone set according to claim 2, wherein the third unit includes a fingerprint certifier unit.

5. The portable telephone set according to claim 1, wherein the first unit includes a fingerprint certifier unit.

6. The portable telephone set according to claim 2, wherein the third unit includes a fingerprint certifier unit.

7. The portable telephone set according to claim 1, which further comprises a position detector part for checking whether adjacent ones of the first, second and auxiliary units are in the stacked state or the extended state.

8. The portable telephone set according to claim 2, which further comprises a position detector part for detecting whether the first unit and the third units are stacked or extended with respect to the second unit.

9. The portable telephone set according to claim 7, which further comprises a mode switching control part for changing the operation mode of the portable telephone set according to the inter-unit state detected by the position detector part.

10. The portable telephone set according to claim 1, which further comprises a control means for performing communication start control when the inter-unit state is changed from the stacked state to the extended state at the time of call reception and doing communication end control when the inter-unit state is changed from the extended state to the stacked state during communication.

11. The portable telephone set according claim 8, which further comprises a mode switching control part for changing the operation mode of the portable telephone set according to the detection of the position detector part.

12. The portable telephone set according to claim 2, which further comprises a control means for performing communication start control and communication end control based on the stacking and extension of the first second and third units.

13. A portable telephone comprising:
an upper casing;
a lower casing slidably coupled to the upper casing; and
an auxiliary unit slidably coupled to the lower casing;
wherein, in a stacked state, the auxiliary unit is at least partially disposed in a space between the upper casing and the lower casing; and
wherein, in a first extended state, the upper casing is slid with respect to lower casing to expose a face of the auxiliary unit which was covered by the upper casing in the stacked state; and
wherein, in a second extended state, both the upper casing and the auxiliary unit are slid with respect to the lower casing so that a component disposed on the lower casing which was covered in the stacked and first extended states is exposed in the second extended state.

14. The portable telephone according to claim 13, wherein the upper casing comprises a display and a receiver.

15. The portable telephone according to claim 13, wherein at least one of the upper casing and the lower casing include a fingerprint certifier unit.

16. The portable telephone according to claim 13, further comprising:
a position detector which detects whether the telephone is in the stacked state or the first extended state; and
a mode switching controller which changes an operation mode of the portable telephone based on the detection of the position detector.

17. A portable telephone comprising:
a first unit comprising a first component;
a second unit comprising a second component; and
a third unit comprising a third component;
wherein the first unit and the third unit are slidably connected to the second unit so that the first unit, the second unit and the third unit may be stacked so that the first component is exposed and the second and third components are at least partially covered, and wherein the first, second and third units may be slid to various extended states so as to expose the first component and second component and at least partially cover the third component, expose the first component and the third component and at least partially cover the second component or to expose the first component the second component and the third component.

18. The portable telephone according to claim 17, wherein the first component comprises a display and a receiver.

19. The portable telephone according to claim 17, wherein at least one of the first, second and third components comprise a fingerprint certifier unit.

20. The portable telephone according to claim 17, further comprising:
a position detector which detects the relative positions of the units; and
a mode switching controller which changes an operation mode of the portable telephone based on the detection of the position detector.

* * * * *